United States Patent
Eckrich et al.

(10) Patent No.: US 10,221,760 B2
(45) Date of Patent: Mar. 5, 2019

(54) CHECK VALVE FOR CONNECTING ROD FOR VARIABLE COMPRESSION INTERNAL COMBUSTION ENGINE

(71) Applicant: ECO Holding 1 GmbH, Marktheidenfeld (DE)

(72) Inventors: Bastian Eckrich, Wertheim (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 137 days.

(21) Appl. No.: 15/607,515

(22) Filed: May 28, 2017

(65) Prior Publication Data

US 2018/0010516 A1 Jan. 11, 2018

(30) Foreign Application Priority Data

Jul. 8, 2016 (DE) .......................... 10 2016 112 573
Mar. 31, 2017 (DE) .......................... 10 2017 106 987

(51) Int. Cl.
*F02B 75/04* (2006.01)
*F16C 7/06* (2006.01)
*F16K 15/08* (2006.01)
*F16K 15/14* (2006.01)

(52) U.S. Cl.
CPC .............. *F02B 75/045* (2013.01); *F16C 7/06* (2013.01); *F16K 15/08* (2013.01); *F16K 15/142* (2013.01)

(58) Field of Classification Search
CPC ...... F02B 75/045; F16K 15/08; F16K 15/142; F16C 7/06; F01L 11/00

USPC .................................. 123/188.1, 48 R, 48 B
See application file for complete search history.

(56) References Cited

U.S. PATENT DOCUMENTS

| 8,225,818 B1 * | 7/2012 | Stephens | F15B 13/0402 137/512.15 |
| 8,733,308 B2 * | 5/2014 | Racklebe | F01L 1/3442 123/90.12 |
| 8,752,514 B2 * | 6/2014 | Schulze | F01L 1/34409 123/90.12 |
| 2015/0075497 A1 * | 3/2015 | Hutzelmann | F02B 75/044 123/48 A |

FOREIGN PATENT DOCUMENTS

| DE | 102005013085 | 6/2006 |
| DE | 102010018200 | 10/2011 |
| DE | 102010019004 | 11/2011 |
| DE | 102010021399 A1 | 6/2014 |
| DE | 102012112481 | 6/2014 |
| DE | 102012112481 A1 | 6/2014 |

(Continued)

*Primary Examiner* — Syed O Hasan
(74) *Attorney, Agent, or Firm* — Von Rohrscheidt Patents (57) ABSTRACT

The invention relates to a check valve for a connecting rod for a variable compression internal combustion engine including at least one hydraulic chamber, the check valve including a valve body with a fluid path that is openable and closable by at least one closure element, wherein the at least one closure element is provided as an annular band. The invention also relates to a connecting rod for a variable compression internal combustion engine including a least one hydraulic chamber that is connectable by the at least one check valve with a bearing shell or a supply connection of the connecting rod or another hydraulic chamber.

3 Claims, 6 Drawing Sheets

(56) References Cited

FOREIGN PATENT DOCUMENTS

| DE | 102014103400 | | 6/2015 |
|----|--------------|----|--------|
| EP | 2466081 | A1 | 6/2012 |
| EP | 2821619 | A1 | 1/2015 |

\* cited by examiner

CHECK VALVE FOR CONNECTING ROD FOR VARIABLE COMPRESSION INTERNAL COMBUSTION ENGINE

RELATED APPLICATIONS

This application claims priority from and incorporates by reference German Patent Applications DE 10 2016 112 573.3 filed on Jul. 8, 2016, and DE 10 2017 106 987.9 filed on Mar. 31, 2017, both of which are incorporated in their entirety by this reference.

FIELD OF THE INVENTION

The invention relates to a check valve for a connecting rod for a variable compression internal combustion engine including at least one hydraulic chamber and a connecting rod with the check valve.

BACKGROUND OF THE INVENTION

In internal combustion engines a high compression ratio has a positive impact upon efficiency of the internal combustion engine. Compression ratio typically is a ratio of an entire cylinder volume before compression relative to a remaining cylinder volume after the compression. In internal combustion engines with external ignition, in particular gasoline engines which have a fixed compression ratio, the compression ratio can only be selected up to a level so that a so called knocking of the internal combustion engine is prevented under full load operation. However, the compression ratio can be selected with higher values for much more prevalent partial load operations of the internal combustion engine thus at a lower level of cylinder filling without the "knocking" occurring. The important partial load operations of an internal combustion engine can be improved when the compression ratio is variably adjustable. In order to adjust the compression ratio for example systems with variable connecting rod length are known which actuate an eccentrical element adjustment device of a connecting rod.

A connecting rod of this type is known from DE 10 2012 112 481 A1 and includes an eccentrical element adjustment device for adjusting an effective connecting rod length wherein the eccentrical element adjustment device includes an eccentrical element cooperating with an eccentrical element lever and two pistons which are respectively movably supported in a hydraulic chamber and wherein the eccentrical element rods of the eccentrical element adjustment device engaging the eccentrical element lever are respectively supported at the two pistons. An adjustment travel of the eccentrical element adjustment is adjustable by a switch valve. Changing the adjustment travel changes the effective connecting rod length. Thus, a compression of the internal combustion engine is controllable. Check valves in the connecting rod respectively prevent a back flow of hydraulic fluid from the hydraulic chambers into the bearing shell or into a supply connection.

BRIEF SUMMARY OF THE INVENTION

Thus, it is the object of the instant invention to provide an improved check valve for a connecting rod for a variable compression internal combustion engine wherein the check valve is configured simple and in a cost effective manner.

It is another object of the invention to provide a connecting rod for a variable compression internal combustion engine wherein the connecting rod is very reliable, has a high service life and thus facilitates simple and cost effective production and assembly.

The object is achieved according to an aspect of the invention by a check valve for a connecting rod for a variable compression internal combustion engine including at least one hydraulic chamber, the check valve including a valve body with a fluid path that is openable and closable by at least one closure element, wherein the at least one closure element is provided as an annular band.

The object is also achieved by a connecting rod for a variable compression internal combustion engine including at least one hydraulic chamber that is connectable by the at least one check valve with a bearing shell or a supply connection of the connecting rod or another hydraulic chamber.

Advantageous embodiments and advantages of the invention can be derived from the additional claims, the description and the drawing figures.

A check valve is proposed for a connecting rod of an internal combustion engine with variable compression, the check valve including at least one hydraulic chamber with a valve element with a fluid path which is openable and closable by a closure element. According to the invention the closure element is provided as an annular band.

The check valve can be advantageously used in a connecting rod for a variable compression internal combustion engine of a motor vehicle wherein the check valve is described in DE 10 2013 107 127 A1 in an exemplary manner. The check valve, however, can also be used in other embodiments of a connecting rod for a variable compression internal combustion engine wherein the connecting rod includes at least one hydraulic chamber which is connectable by the check valve with a bearing shell or a supply connection, e.g. a tank of the connecting rod, wherein the check valve prevents a back flow to the bearing shell or to the supply connection. Thus the check valve can be provided directly under the hydraulic chamber or in a transversal bore hole of the connecting rod. The check valve is configured in a simple and cost effective manner. In particular functional disadvantages can be avoided.

The check valve according to the invention includes a valve body through which a fluid path of a hydraulic fluid extends between at least one hydraulic chamber and a bearing shell or a supply connection of the connecting rod or of another hydraulic chamber. The valve body includes openings configured as bore holes or grooves which are closable by a closure element. The closure element is provided according to the invention as an annular band, for example as an elastic sheet metal band which can be slotted at one location on its circumference, so that it is expandable in a radially outward direction or compressible in a radially inward direction. An elastic sheet metal band of this type includes sufficient internal tension to close an opening which is advantageously arranged on a circumference of a cylindrical valve element wherein the closing is facilitated through spring tension. The closure element can then release the fluid path through a sufficiently high hydraulic pressure in one pass through direction, whereas the fluid path is blocked in the opposite direction by the hydraulic pressure on the closure element. This way the function of a check valve can be implemented in a simple and cost effective manner. No additional components are required since the closure element and the spring element are implemented in one component. By selecting a suitable elastic sheet metal band as an annular band a necessary pressure can be set for opening the closure element, for example by selecting a sheet metal thickness. The ring band of this type also provides a very space saving closure element so that a compact configuration for the check valve can be implemented. A check valve of this type has a robust function, a high level of reliability and a high service life. Due to the compact arrangement of the closure element it can be mounted easily and can be integrated into a connecting rod in a simple manner.

The check valve can be advantageously used in a length adjustable connecting rod. The annular band configured as a closure element can be arranged with a radially outward opening function and a radially inward opening function of the check valve. Thus, it is advantageous when the ends of the annular band are oriented towards each other in the radially outward opening configuration in the installed position at the circumference of the valve body, this means they are arranged non-overlapping wherein the ends of the annular band are advantageously configured overlapping in the radially inward opening configuration. In the embodiment with an open joint of the ends of the annular band a radially inserted bolt can be arranged for example for securing the annular band against a rotation in the circumferential direction. The check valve can be advantageously pressed or also threaded into the connecting rod. In both ways mounting the check valve in the connecting rod can be implemented in an advantageous manner. The installation location in the connecting rod can be for example directly at a hydraulic chamber of the connecting rod or also in a transversal bore hole in the connecting rod body with corresponding hydraulic fluid conduits for the hydraulic fluid.

According to an advantageous embodiment the annular band can be provided so that it is openable in a radially outward direction. Through a corresponding hydraulic pressure of the hydraulic fluid on the fluid path extending in an interior of the valve body the annular band can be expanded in an outward direction and thus release an opening in the valve body so that the hydraulic fluid can flow in the outward direction. When there is a lower pressure in the fluid path than the sum of the hydraulic pressure on the outside of the check valve and the spring pressure of the preloaded annular band the closure element remains closed and the check valve blocks.

According to an advantageous embodiment radially outward oriented, in particular circumferential protrusions can be provided in a longitudinal direction on both sides of the closure element for limiting an axial movement of the closure element. The protrusions can advantageously prevent for an expanded annular band that the annular band is axially movable in the longitudinal direction of the valve body. Thus, the annular band can also be advantageously arranged in a groove extending on the outer circumference of the valve body.

According to an advantageous embodiment the annular band can be provided so that it is openable in a radially inward direction. Through a corresponding hydraulic pressure of the hydraulic fluid outside of the valve body the annular band is compressible in an inward direction so that it releases an opening in the valve body so that hydraulic fluid can flow in the inward direction. When a lower pressure is provided on the outside of the check valve, than the sum of the hydraulic pressure in the fluid path within the valve body and the spring pressure of the preloaded annular band, the closure element remains closed and the check valve blocks.

According to an advantageous embodiment a radially inward oriented, in particular circumferential safety element can be provided for limiting an axial movement of the closure element in the longitudinal direction. The radially inward opening annular band be inserted for example into the valve body that is configured as a hollow cylinder which is closed at one end and the annular band can be fixated for example in the longitudinal direction by a safety element configured as an annular sleeve thus the annular band cannot move in the longitudinal direction even when it is pressed inward. This way a reliable function of the check valve can be provided.

According to an advantageous embodiment ends of the annular band can be configured overlapping in the installed condition. In particular for a radially inward opening band the ends can overlap so that both ends of the annular band can slide over each other when the annular band is pressed in the inward direction and the circumference of the annular band is reduced. Thus, the opening and closing function can be reliably performed by the annular band.

According to an advantageous embodiment ends of the annular band can be arranged in an installed condition so that they are oriented towards each other at a circumference of the valve element, this means so that they do not overlap. In particular for a radially outward opening annular band the ends can be configured offset from each other as an open joint so that both ends do not contact each other when the annular band expands and moves back into the installed condition for a decreasing hydraulic pressure which could otherwise lead to leakage of the check valve. This way the function of opening and closing can be performed by the annular band reliably.

According to an advantageous embodiment a bolt can be provided to secure the annular band in place. Instead of the open joint of the annular band a bolt can be arranged in the radial direction wherein the bolt can prevent a rotation of the annular band in the circumferential direction. This way the function of opening and closing can be provided by the annular band since the annular band covers the openings of the valve body reliably and does not change its position.

According to an advantageous embodiment the fluid path can include two partial paths which are openable and closable with one or plural closure elements. The fluid path which is fed from a supply conduit with hydraulic fluid can be divided into two partial paths for example in an interior of the valve body by two openings of the valve body wherein the two openings are hydraulically connected with two separate hydraulic chambers in the connecting rod. The two partial paths can be provided with a common closure element or with plural closure elements in order to be jointly or separately opened and closed.

According to an advantageous embodiment the closure elements can be openable and closable independently from each other. In particular when the two partial paths of the fluid path are hydraulically connected with two separate hydraulic chambers in the connecting rod it is advantageous when the two partial paths are openable and closable independently from each other by two closure elements.

According to another aspect of the invention a connecting rod is proposed for a variable compression internal combustion engine wherein the connecting rod includes at least one hydraulic chamber, wherein the hydraulic chamber is connectable by a check valve with a bearing shell or a supply connection of the connecting rod or another hydraulic chamber. The connecting rod can be advantageously configured as a longitudinally adjustable connecting rod.

The check valve includes a valve body with a fluid path which is openable and closable by a closure element. The closure element is provided as an annular band. The annular band configured as the closure element can be arranged with a radially outward opening function or a radially inward opening function of the check valve. Thus, it is advantageous when ends of the annular band in the radially outward opening configuration are oriented towards each other at the circumference of the valve body in the installed condition, this means are arranged non-overlapping, whereas the ends of the annular band are advantageously configured overlapping in the installed condition in the radially inward opening configuration. In the embodiment with the open joint of the ends of the annular band a radially inserted bolt can be arranged to secure the position of the annular band.

According to an advantageous embodiment the check valve can be provided threaded or pressed into a connecting rod body of the connecting rod. Both ways the check valve can be mounted in the connecting rod in a simple manner. Sealing the check valve in the connecting rod body can be facilitated by both mounting methods through gaskets or solely by impressing.

According to an advantageous embodiment the check valve can be arranged below the hydraulic chamber and/or in a transversal bore hole of the connecting rod. Thus, the check valve can be used directly adjacent to the hydraulic chamber with a direct connection to the hydraulic chamber. Alternatively, however, it is also possible to arrange the check valve in a transversal bore hole of the connecting rod body wherein the transversal bore hole is connected with the bearing shell or the supply connection of the connecting rod and the hydraulic chambers through corresponding hydraulic fluid conduits.

According to an advantageous embodiment a respective check valve can be associated with a hydraulic chamber for a connecting rod with two hydraulic chambers. Advantageously a proprietary associated check valve can be used for each hydraulic chamber so that the function of the check valve in a hydraulic inlet and/or outlet of the hydraulic chamber can be provided independently from the hydraulic pressure in the other hydraulic chamber.

According to an advantageous embodiment a single check valve can be provided for both hydraulic chambers in a connecting rod with two hydraulic chambers, wherein the fluid path in the valve body includes partial paths which are respectively associated with a hydraulic chamber. The check valve function can thus also be advantageously provided for each partial path when independent closure elements are used for each partial path. Thus, a particularly space saving configuration of the connecting rod can be implemented with a single check valve.

BRIEF DESCRIPTION OF THE DRAWINGS

Further advantages can be derived from the subsequent drawing description. The drawing figures schematically illustrate an embodiment of the invention. The drawing figures, the description and the patent claims include numerous features in combination. A person skilled in the art will advantageously also view the features individually and combine them into useful other combinations, wherein:

DETAILED DESCRIPTION OF THE INVENTION

In the figures identical or like components are designated with reference numerals which are increased by 100 respectively in the different embodiments. Repetitive descriptions are thus omitted. The figures show only embodiments and do not limit the spirit and scope of the invention.

The subsequently described check valves are advantageously used in a connecting rod for a variable compression internal combustion engine of a motor vehicle which is described in an exemplary embodiment in DE 10 2013 107 127 A1. The check valves, however can also be used in other embodiments of a connecting rod 501 for an internal combustion engine with variable compression as illustrated e.g. in FIG. 23 which includes at least one hydraulic chamber 510, 511 which is connectable by the check valve 101 with a bearing shell 514 or a supply connection P, e.g. a tank of the connecting rod 501, wherein the check valve 501 prevents a back flow to the bearing shell 514 or to the supply connection P. The check valve 101 can thus be provided directly below the hydraulic chamber 510, 511 or in a transversal bore hole 540, 541 of the connecting rod 501.

From FIGS. 1-5 various views and sectional views of a first embodiment of a check valve 1 according to the invention can be derived. The check valve 1 includes a valve body 3 arranged in a valve housing 2 and including a fluid path 4 which is indicated by arrows in the longitudinal sectional view A-A according to FIG. 3. The fluid path 4 is operable and closable by a closure element 5. It is evident that the closure element 5 is provided as an annular band which closes one or more openings 6 in the valve body 3. The annular band can be implemented for example as an elastic sheet metal band. Under a pressure that is predetermined by the annular band the annular band opens in a radially outward direction and facilitates a fluid flow into the non-illustrated hydraulic chamber of the connecting rod.

Ends of the annular band do not overlap in the first embodiment, thus a bolt 7 is provided in order to secure the annular band in position, wherein the bolt is arranged between both ends of the annular butt joint so that a rotation of the annular band can be prevented reliably. Securing the annular band in position axially is performed by a circumferential shoulder 8 of the valve element 3 and a valve cover 9 whose pass through bore holes 10 form a portion of the fluid path 4 and which is advantageously pressed into the valve housing 2.

The valve housing 2 can be threaded by a thread 11 into a connecting rod body of the connecting rod.

A second embodiment of a check valve 101 according to the invention can be derived from FIGS. 6-9. The check valve 101 only includes one valve body 103 which can be pressed into the connecting rod body of the connecting rod. A closure element 105 is also provided as a radially outward opening annular band which is secured in position by a bolt 107 arranged between the open butt joint ends of the annular band so that the annular band closes openings 106 of the valve body 103 reliably. Securing the annular band axially against a sliding in the longitudinal direction L is provided by radially outward oriented circumferential protrusions 112 and 113 of the valve body 103. The fluid path 104 is partially provided by an axial dead hole 114 which is closed tight by a bearing ball plug 115. As evident in particular from FIGS. 8 and 9 the fluid path 104 includes a transversal bore hole 116 which is connected with the supply connection P in the connecting rod and openings 106 configured as transversal bore holes which lead into the dead hole 114.

In order to provide axial positioning the bolt 7 or 107 can also protrude through a bore hole of the annular band.

The third embodiment of a check valve 201 according to the invention that is illustrated in FIGS. 10-14 includes an annular band as a closure element 205 which differs from the first two embodiments, wherein the annular band is openable in a radially inward direction and ends of the annular band overlap in the installed position. Thus, the annular band closes the radially outward oriented openings 206 of the valve body 203 in the installed position. The annular band is arranged in a step shaped recess 217 of the valve body 203 which is threaded into the piston body by a thread 211. A circumferential safety element 218 that is pressed into the recess 217 and oriented radially inward prevents the annular band from sliding out.

The fluid path 204 runs through a central bore hole of the safety element 218 into an interior of the valve body 203 and the annular band. Thus, the hydraulic fluid can flow radially inward when opening the annular band according to the fluid path 204 through the openings 206 in a radially outward direction to the hydraulic chambers of a connecting rod.

The check valves 1, 101, 201 described supra are respectively associated with a hydraulic chamber of a connecting rod.

According to the fourth embodiment illustrated in FIGS. 15-22 a single check valve 301 is provided for both hydraulic chambers of a connecting rod. For this purpose a valve body 303 includes three annular grooves 320, 321, 322. In the annular grooves 320 and 322 a radially outward openable closure element 305 is provided in a form of an annular band which closes openings 306 that are connected with the hydraulic chambers. The annular band is respectively secured by a bolt 307 against a rotation in the circumferential direction.

Plural openings 306 that are arranged in the annular grooves 320 and 322 are connectable with a hydraulic chamber. A fluid path 304 is partially formed by an axial dead hole 314 which is closed tight by a bearing ball plug 315. As evident in particular from FIGS. 17 and 20 the fluid path 304 includes transversal bore holes 316 arranged in the annular groove 321 and connected with the supply connection P and openings 306 configured as transversal bore holes in the ring grooves 320, 322 wherein the openings lead as partial paths 324, 325 into the dead hole 314. Arranging the two separate closure element 305 in the grooves 320 and 322 of the valve body 303 facilitates opening and closing both partial paths 324, 325 independently from each other.

Figure 1:
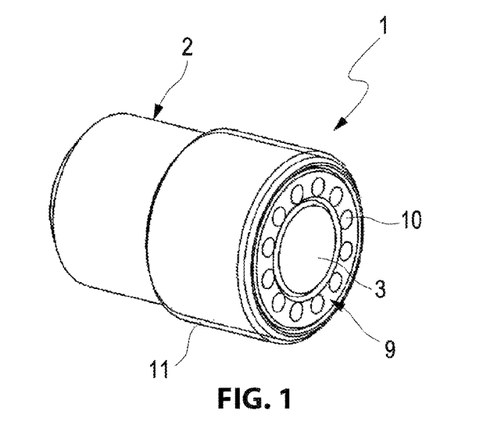
FIG. 1 illustrates a perspective view of a first embodiment of a check valve according to the invention.
Figure 2:
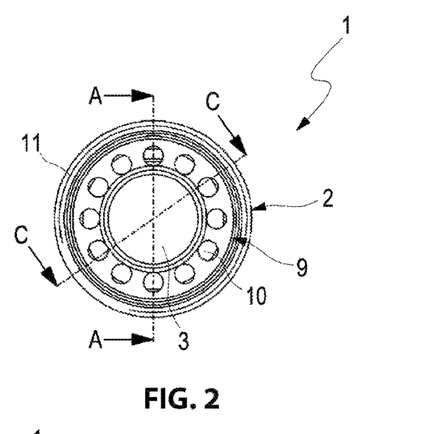
FIG. 2 illustrates a side of the check valve according to FIG. 1.
Figure 3:
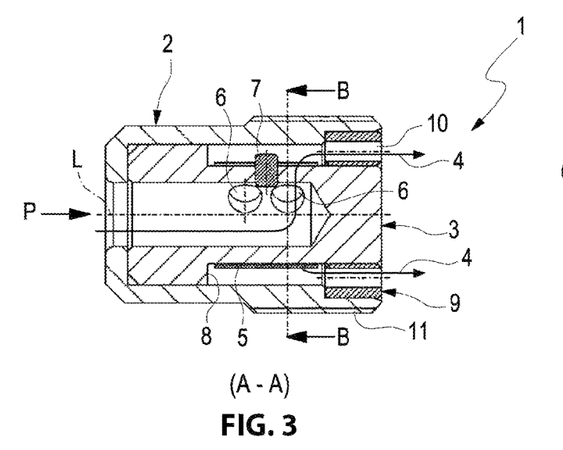
FIG. 3 illustrates a first longitudinal sectional view of the check valve according to the FIG. 1.
Figure 4:
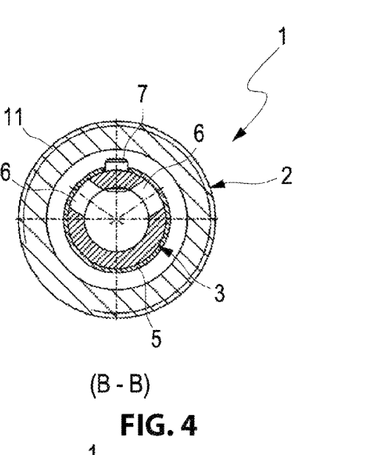
FIG. 4 illustrates a cross sectionals view B-B of the check valve according to FIG. 1.
Figure 5:
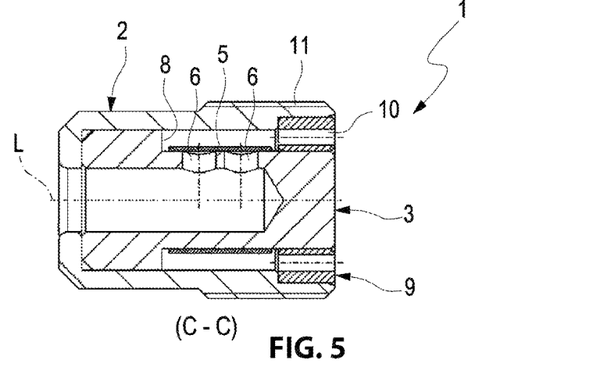
FIG. 5 illustrates a second longitudinal sectional view C-C of the check valve according to FIG. 1.
Figure 6:
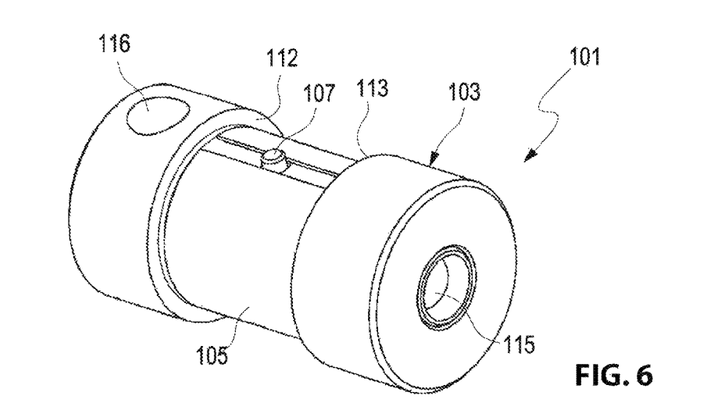
FIG. 6 illustrates a perspective view of a second embodiment of a check valve according to the invention.
Figure 7:
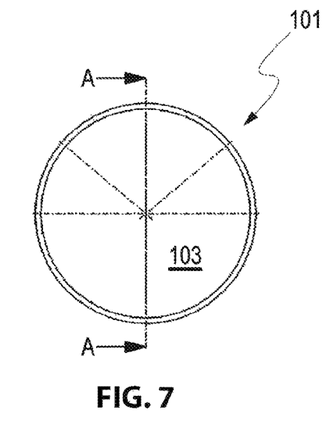
FIG. 7 illustrates a side view of the check valve according to FIG. 6.
Figure 8:
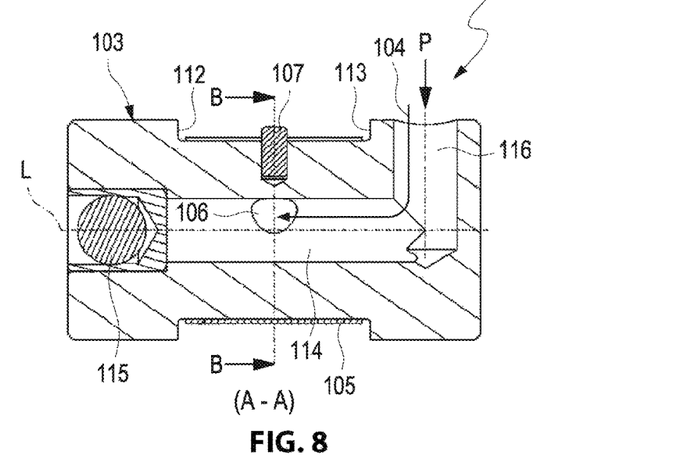
FIG. 8 illustrates a longitudinal sectional view A-A of the check valve according to FIG. 6.
Figure 9:
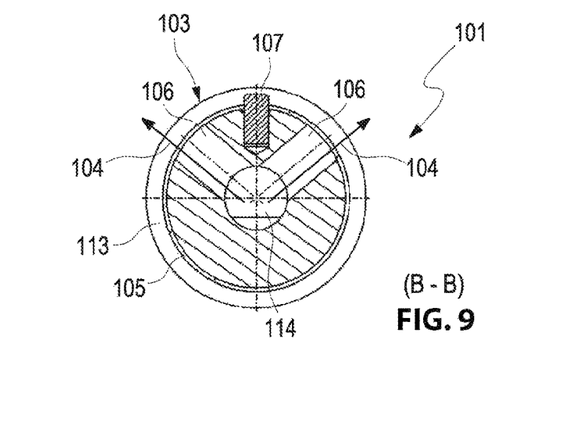
FIG. 9 illustrates a cross sectional view B-B of the of the check valve according to FIG. 6.
Figure 10:
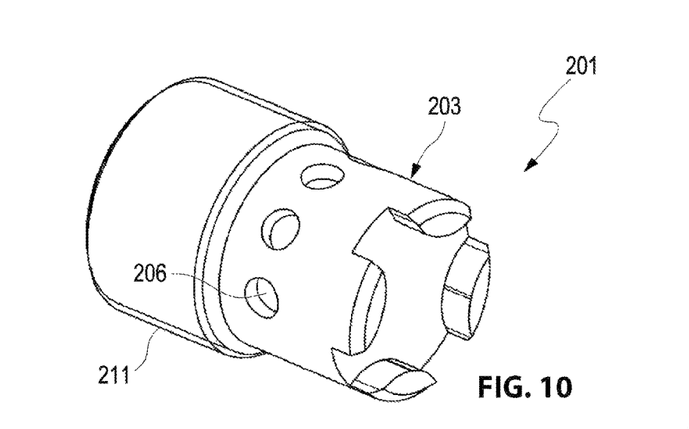
FIG. 10 illustrates a perspective view of a third embodiment of the check valve according to the invention.
Figure 11:
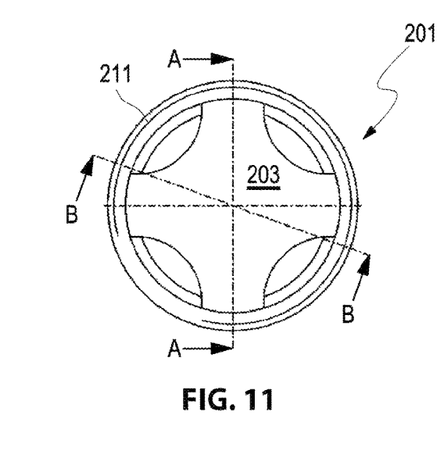
FIG. 11 illustrates a side view of the check valve according to FIG. 10.
Figure 12:
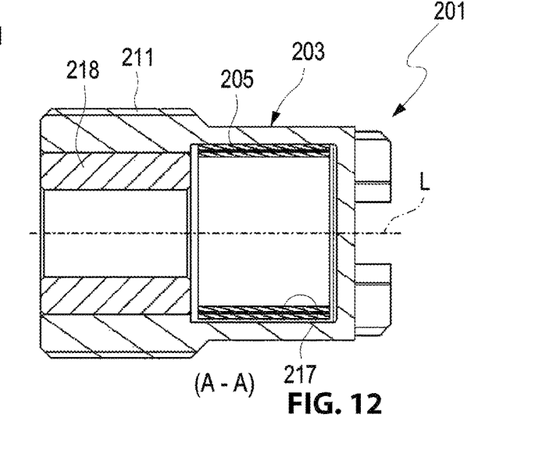
FIG. 12 illustrates a first longitudinal sectional view A-A of the check valve according to FIG. 10.
Figure 13:
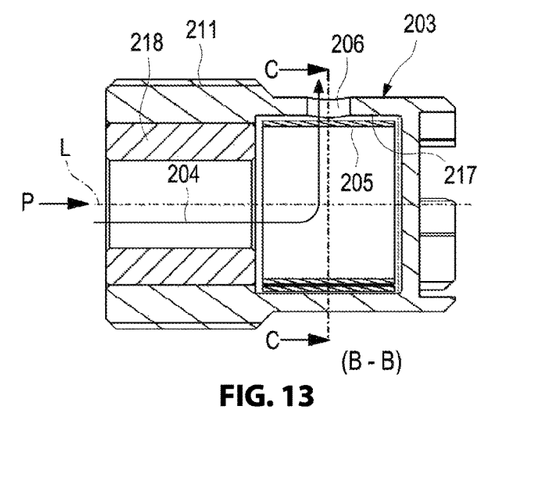
FIG. 13 illustrates a second longitudinal sectional view B-B of the check valve according to FIG. 10.
Figure 14:
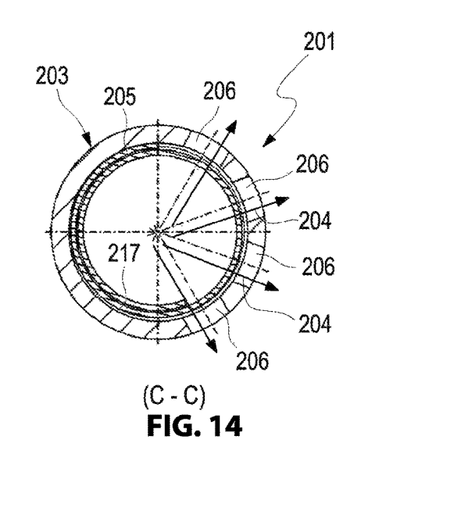
FIG. 14 illustrates a cross sectional view C-C of the check valve according to FIG. 10.
Figure 15:
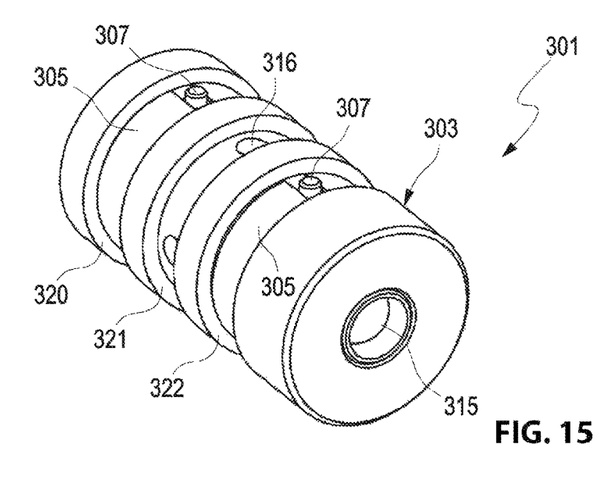
FIG. 15 illustrates a perspective view of a fourth embodiment of a check valve according to the invention.
Figure 16:
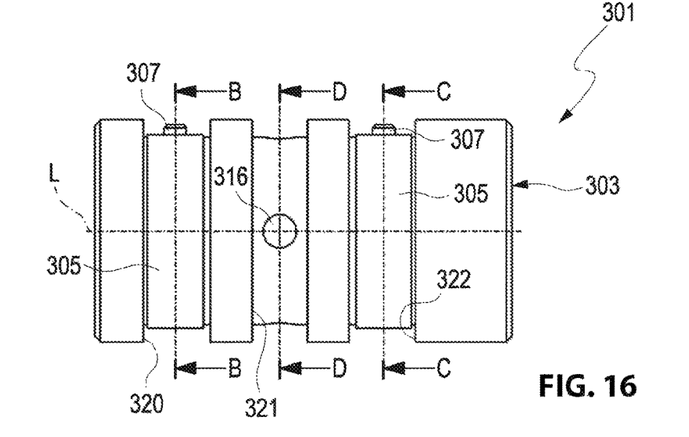
FIG. 16 illustrates a top view of the check valve according to FIG. 15.
Figure 17:
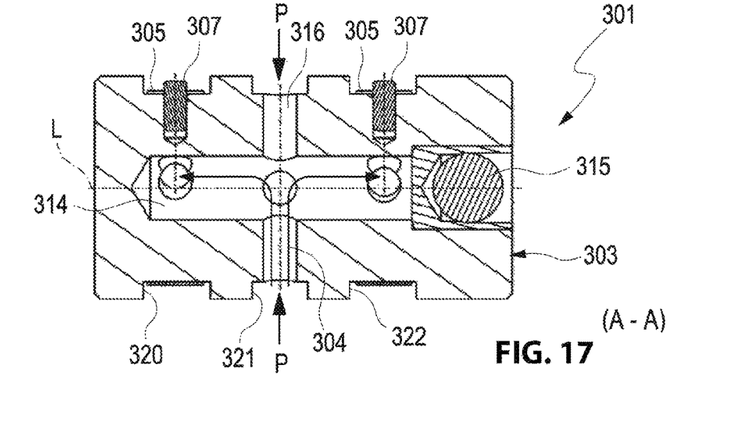
FIG. 17 illustrates a first longitudinal sectional view of the check valve according to FIG. 15.
Figure 18:
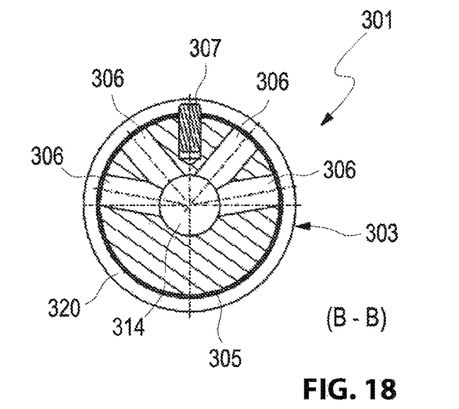
FIG. 18 illustrates a first cross sectional view B-B of the check valve according to FIG. 15.
Figure 19:
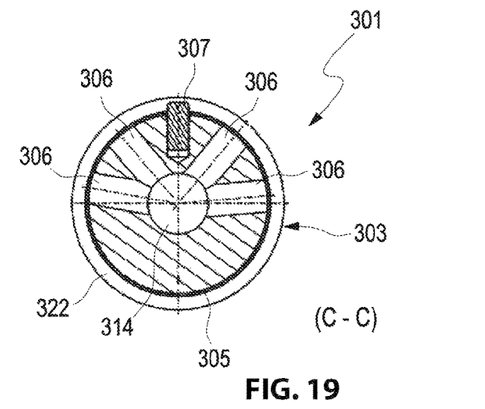
FIG. 19 illustrates a second cross sectional view of the check valve according to FIG. 15.
Figure 20:
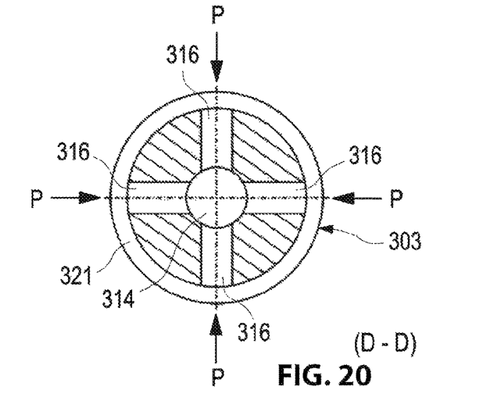
FIG. 20 illustrates a third cross sectional view of the check valve according to FIG. 15.
Figure 21:
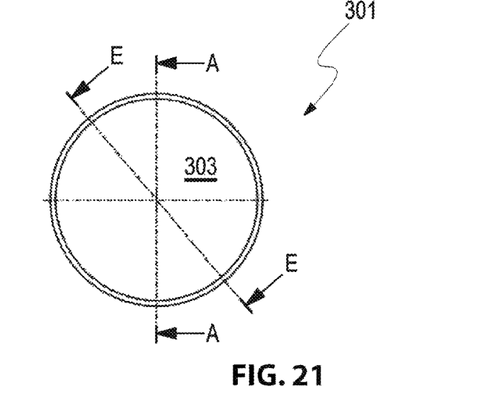
FIG. 21 illustrates a side view of the check valve according to FIG. 15.
Figure 22:
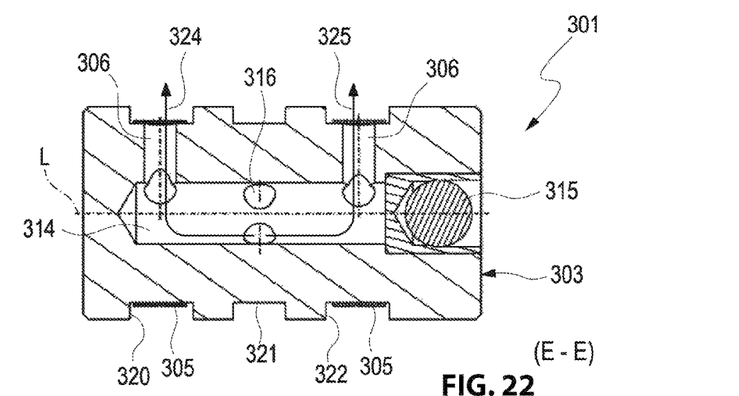
FIG. 22 illustrates a second longitudinal sectional view E-E of the check valve according to FIG. 15.
Figure 23:
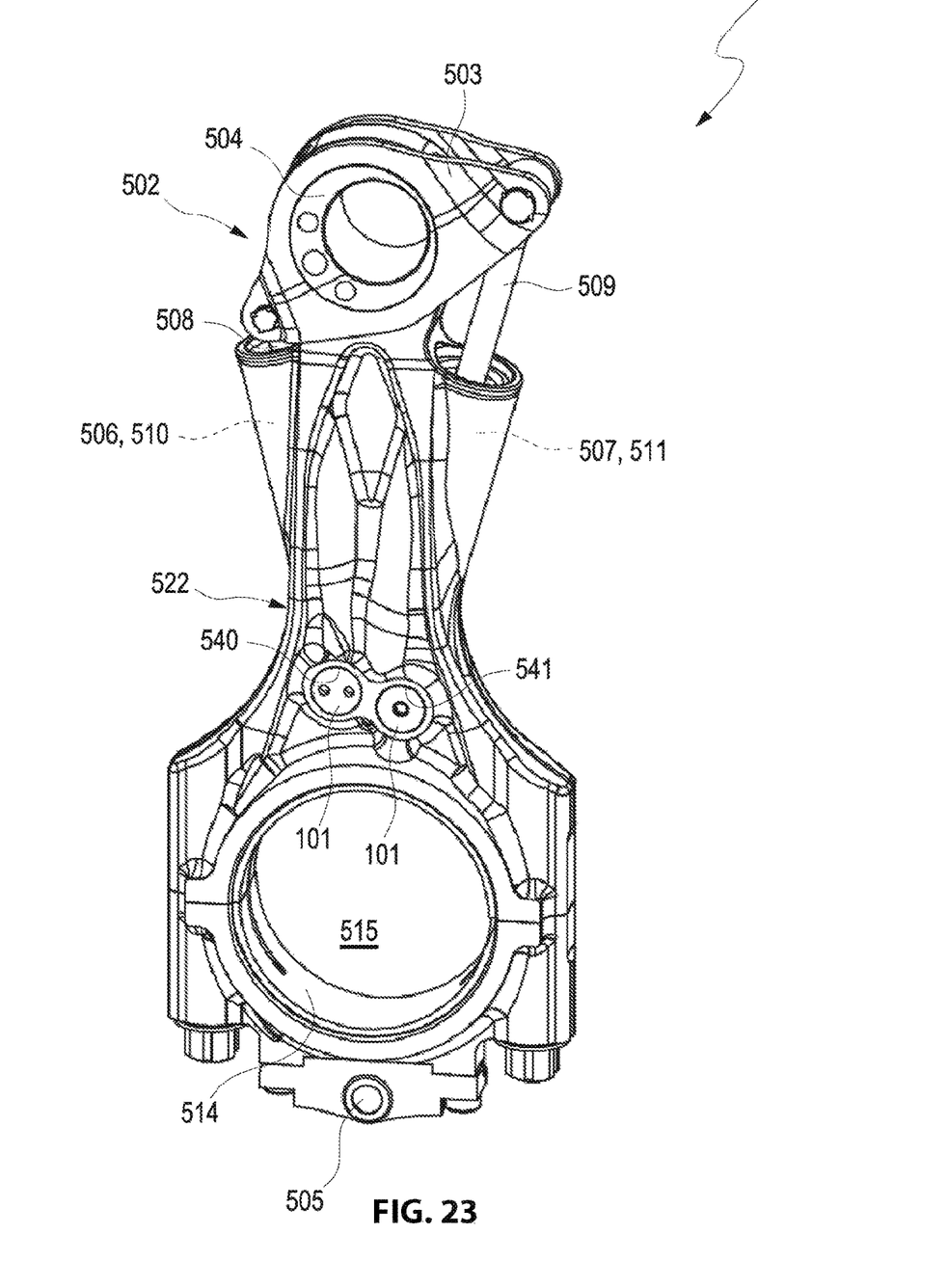
FIG. 23 illustrates a connecting rod according to an embodiment of the invention in a front view.

FIG. 23 illustrates a front view of a connecting rod 501 according to the invention for a variable compression internal combustion engine with check valves 101 in a schematic view in a high compression position designated as E-high. The connecting rod 501 includes an eccentrical element adjustment device 502 for adjusting an effective connecting rod length. The eccentrical element adjustment device 502 includes an eccentrical element 504 cooperating with a one component or multi component eccentrical element lever 503. Thus, an adjustment travel of the eccentrical element adjustment device 502 is adjustable by a switch valve 505.

A rotation of the eccentrical element adjustment device 502 is initiated by an influence of mass forces and gas forces of the internal combustion engine which impact the eccentrical element adjustment device 502 during an operating stroke of the internal combustion engine. During the operating stroke the effective directions of forces impacting the eccentrical element adjustment device 502 change continuously. The rotating movement or adjustment movement is supported by a piston 506, 507 loaded with hydraulic fluid, in particular motor oil and integrated in the connecting rod 501 or the pistons 506, 507 prevent a reset of the eccentrical element adjustment device 502 due to varying force effective directions of forces impacting the eccentrical element adjustment device 502.

The pistons 506, 507 are operatively connected by eccentrical element rods 508, 509 on both sides with the eccentrical element lever 503 of the eccentrical element adjustment device 502. The pistons 506, 507 are movably arranged in the hydraulic chambers 510, 511 and loaded with the hydraulic fluid through check valves 101 through hydraulic fluid conduits from the bearing shell 514 of the crank bearing eye 515. The check valves thus prevent a back flow of the hydraulic fluid from the hydraulic chambers 510, 511 into the hydraulic fluid conduits into the bearing shell 514 of the crank bearing eye 515 or a tank and facilitate sucking additional hydraulic fluid into the hydraulic chambers 510, 511. The hydraulic chambers 510, 511 are connected with additional hydraulic fluid conduits which cooperate with the switch valve 505. The switch valve 505 is also connected with the bearing shell 514 through two hydraulic fluid conduits.

The two check valves 101 are also respectively arranged in the connecting rod body 522 in the transversal bore holes 540, 541 and connected through hydraulic fluid conduits with the bearing shell 514, wherein the check valves 101 can be pressed in or threaded in.

Alternatively check valves 101 could also be arranged below the hydraulic chambers 510, 511.

In the embodiment illustrated in FIG. 23 a respective check valve 101 is associated with a hydraulic chamber 510, 511. Alternatively, however also only one single check valve 301 (c.f. FIGS. 15-22) can be provided for both hydraulic chambers 510, 511 wherein the fluid path 304 includes partial paths 324, 325 in the valve body 303 in this embodiment, wherein the partial paths 324, 325 are respectively connected through hydraulic fluid conduits with a hydraulic chamber 510, 511.

Another non-illustrated embodiment of a connecting rod according to the invention with two hydraulic chambers 510, 511 provides that the check valve according to the invention facilitates connecting a hydraulic chamber 511 (the hydraulic chambers of the gas force side) with the other hydraulic chamber 510 (hydraulic chamber 510 of the mass force side) so that the other hydraulic chamber 510 is fed by the hydraulic chamber 511 of the gas force side.

What is claimed is:

1. A connecting rod for a variable compression internal combustion engine including at least one hydraulic chamber that is connectable by at least one check valve with a bearing shell, wherein the at least one check valve is threaded or pressed into a connecting rod body of the connecting rod, wherein the at least one check valve is arranged below the hydraulic chamber and in a transversal bore hole of the connecting rod, wherein the at least one check valve includes a valve body with a fluid path that is openable and closable by at least one closure element, wherein the at least one closure element is provided as an annular band, wherein the annular band is radially openable towards an outside, and wherein radially outward oriented protrusions are provided in a longitudinal direction on both sides of the at least one closure element and limit an axial movement of the at least one closure element.

2. A connecting rod for a variable compression internal combustion engine including at least one hydraulic chamber that is connectable by at least one check valve with a bearing shell, wherein the at least one check valve is threaded or pressed into a connecting rod body of the connecting rod, wherein the at least one check valve is arranged below the hydraulic chamber and in a transversal bore hole of the connecting rod, wherein the at least one check valve includes a valve body with a fluid path that is openable and closable by at least one closure element, wherein the at least one closure element is provided as an annular band, wherein the annular band is openable in a radially inward direction, and wherein a radially inward oriented safety element is provided to limit an axial movement of the at least one closure element in a longitudinal direction.

3. A connecting rod for a variable compression internal combustion engine including at least one hydraulic chamber that is connectable by at least one check valve with a bearing shell, wherein the at least one check valve is threaded or pressed into a connecting rod body of the connecting rod, wherein the at least one check valve is arranged below the hydraulic chamber and in a transversal bore hole of the connecting rod, wherein the at least one check valve includes a valve body with a fluid path that is openable and closable by at least one closure element, wherein the at least one closure element is provided as an annular band, wherein ends of the annular band are arranged in an installed position of the annular band at a circumference of the valve body so that the ends of the annular band are oriented towards each other and offset from each other, and wherein a bolt is provided which fixates the annular band in place.

* * * * *